(12) United States Patent
Sanders

(10) Patent No.: US 7,907,585 B2
(45) Date of Patent: Mar. 15, 2011

(54) NETWORK INTERFACE DEVICE WITH SHARED ANTENNA

(75) Inventor: Stuart B. Sanders, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 398 days.

(21) Appl. No.: 12/105,363

(22) Filed: Apr. 18, 2008

(65) Prior Publication Data

US 2009/0262669 A1 Oct. 22, 2009

(51) Int. Cl.
*H04H 20/67* (2008.01)
(52) U.S. Cl. .......................................... 370/339
(58) Field of Classification Search .................. 370/278, 370/282, 462–463, 339; 455/83, 88, 575.7
See application file for complete search history.

(56) References Cited

U.S. PATENT DOCUMENTS

| | | | |
|---|---|---|---|
| 2003/0203743 A1 | 10/2003 | Sugar et al. | |
| 2004/0192222 A1* | 9/2004 | Vaisanen et al. | 455/78 |
| 2006/0135206 A1* | 6/2006 | Louks et al. | 455/557 |
| 2006/0269022 A1* | 11/2006 | Li et al. | 375/347 |
| 2007/0238483 A1 | 10/2007 | Boireau et al. | |
| 2008/0089350 A1* | 4/2008 | Liu et al. | 370/401 |
| 2008/0310487 A1* | 12/2008 | Hammerschmidt et al. | 375/219 |
| 2009/0075608 A1* | 3/2009 | Ichitsubo | 455/127.2 |

OTHER PUBLICATIONS

International Search Report and Written Opinion from corresponding International Application No. PCT/US08/80418.

* cited by examiner

*Primary Examiner* — Derrick W Ferris
*Assistant Examiner* — Omar Ghowrwal
(74) *Attorney, Agent, or Firm* — Renner, Otto, Boisselle & Sklar, LLP

(57) ABSTRACT

An improved network interface device includes at least two wireless network transceivers where the transceivers share at least one antenna. In one embodiment, one of the transceivers is a 2×2 MIMO WiFi N transceiver and the other of the transceivers is a 2×1 MIMO WiMAX transceiver. A priority selector and lockout control circuit is used to control which transceiver has access to the shared antenna. The control circuit of one embodiment is arranged so the WiMAX transceiver is given priority access to the shared antenna.

9 Claims, 3 Drawing Sheets

NETWORK INTERFACE DEVICE WITH SHARED ANTENNA

TECHNICAL FIELD

The technology of the present disclosure relates generally to wireless network interface devices and, more particularly, to a network interface device with an antenna that is shared between at least two multiple-input, multiple-output (MIMO) network transceivers.

BACKGROUND

In a wireless networking device that has multiple network transceivers, such as a MIMO WiMAX transceiver and a MIMO WiFi transceiver, there can be a large number of antennas. Each antenna consumes valuable space. Exemplary multiple transceiver devices include a removable universal serial bus (USB) network dongle, a removable personal computer memory card international association (PCMCIA) network card, an internal network card for a computer, and a network interface device that is made part of a portable device, such as a mobile telephone.

SUMMARY

To improve network interface devices, the present disclosure describes an improved network interface device that includes at least two wireless network transceivers where the transceivers share at least one antenna. In one embodiment, one of the transceivers is a 2×2 MIMO WiFi N transceiver and the other of the transceivers is a 2×1 MIMO WiMAX transceiver. A priority selector and lockout control circuit is used to control which transceiver has access to the shared antenna. The control circuit of one embodiment is arranged so the WiMAX transceiver is given priority access to the shared antenna.

According to one aspect of the disclosure, a wireless network interface device includes a first wireless network transceiver; a second wireless network transceiver; an antenna that is shared between the first and second transceivers; and a control circuit that, during an active state of the second transceiver, locks out a transmission path of the first transceiver that uses the shared antenna.

According to one embodiment, the wireless network interface device further includes a radio frequency mode switch that is controlled by the control circuit to switch a receive path input of the second transceiver to the shared antenna during a receive mode of the second transceiver and to a transmit and receive path of the first transceiver during a transmission mode of the second transceiver.

According to one embodiment of the wireless network interface device, the switch is part of a front end module for the second transceiver.

According to one embodiment of the wireless network interface device, during the transmission mode of the second transceiver, the first transceiver receives signals compatible with an interface standard of the first transceiver over the shared antenna.

According to one embodiment of the wireless network interface device, during the active state of the second transceiver, the control circuit controls the position of the switch using a transmit/receive baseband signal of the second transceiver.

According to one embodiment of the wireless network interface device, the lockout is achieved by turning off a power amplifier in the transmission pathway from the first transceiver to the shared antenna.

According to one embodiment of the wireless network interface device, the power amplifier is part of a front end module for the first transceiver.

According to one embodiment of the wireless network interface device, during in a non-active state of the second transceiver, a power amplifier in the transmission pathway from the first transceiver to the shared antenna is controlled by the control circuit using a transmit enable baseband signal of the first transceiver.

According to one embodiment of the wireless network interface device, the first transceiver is a WiFi transceiver and the second transceiver is a WiMAX transceiver.

According to one embodiment of the wireless network interface device, the first transceiver has a first transmit/receive path that transmits and receives using an antenna dedicated to the first transceiver and a second transmit/receive path that uses the shared antenna; and the second transceiver has a transmit/receive path that transmits and receives using an antenna dedicated to the second transceiver and a second receive path that uses the shared antenna.

According to one embodiment of the wireless network interface device, the first transceiver is a 2×2 multiple-input multiple-output WiFi transceiver and the second transceiver is a 2×1 multiple-input multiple-output WiMAX transceiver.

According to one embodiment of the wireless network interface device, the first transceiver carries out wireless communication with a wireless access point of a first network and the second transceiver carries out wireless communication with a wireless access point of a second network simultaneously with the wireless communication carried out by the first transceiver.

According to one embodiment of the wireless network interface device, the wireless network interface device is part of a removable network interface accessory for an electronic device.

According to one embodiment of the wireless network interface device, the wireless network interface device is part of an electronic device.

According to one embodiment of the wireless network interface device, the electronic device is a mobile telephone.

According to another aspect of the disclosure, a method of conducting wireless communications simultaneously with a first wireless network and a second wireless network includes establishing a network interface between a first wireless network transceiver and the first network; establishing a network interface between a second wireless network transceiver and the second network; and sharing an antenna between the first and second transceivers during the wireless communications by locking out a transmission path of the first transceiver that uses the shared antenna during an active state of the second transceiver.

According to one embodiment of the method, the sharing includes switching a radio frequency mode switch to couple a receive path input of the second transceiver to the shared antenna during a receive mode of the second transceiver and to a transmit and receive path of the first transceiver during a transmission mode of the second transceiver so that during the transmission mode of the second transceiver, the first transceiver receives signals compatible with an interface standard of the first transceiver over the shared antenna.

According to one embodiment of the method, the lockout is achieved by turning off a power amplifier in the transmission pathway from the first transceiver to the shared antenna.

According to one embodiment of the method, the first transceiver is a WiFi transceiver and the second transceiver is a WiMAX transceiver.

According to one embodiment of the method, the first transceiver has a first transmit/receive path that transmits and receives using an antenna dedicated to the first transceiver and a second transmit/receive path that uses the shared antenna; and the second transceiver has a transmit/receive path that transmits and receives using an antenna dedicated to the second transceiver and a second receive path that uses the shared antenna.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
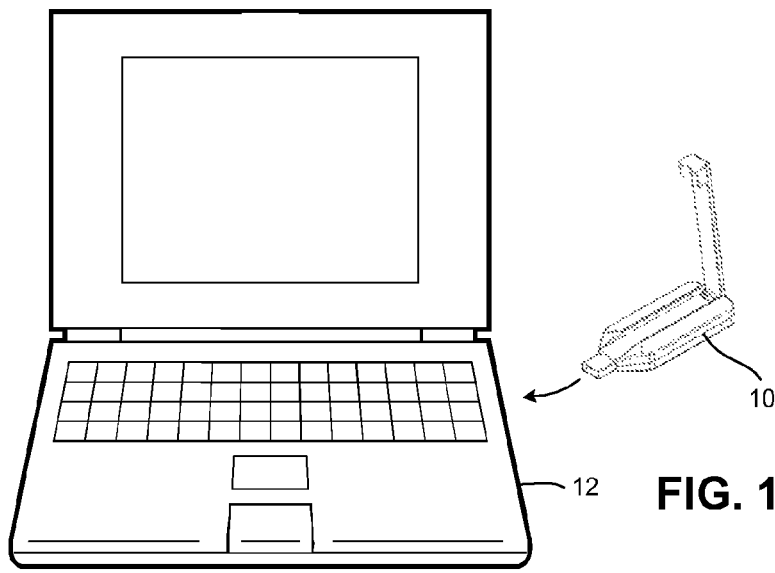
FIG. 1 is a schematic view of a portable laptop computer with a network interface device that includes plural wireless network transceivers that share an antenna.

Embodiments will now be described with reference to the drawings, wherein like reference numerals are used to refer to like elements throughout. It will be understood that the figures are not necessarily to scale.

In the present document, some embodiments are described primarily in the context of a mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Referring initially to FIG. 1, shown is one exemplary environmental context in which a network interface device 10 may be employed. In the embodiment of FIG. 1, the network interface device 10 is an accessory for an electronic device 12 that enables the electronic device 12 to wirelessly communicate over plural types of wireless networks. In the illustrated embodiment, the network interface device 10 is a USB dongle and the electronic device 12 is a computer having a "laptop" form factor. In other exemplary embodiments, the network interface device 10 may be embodied as a different kind of removable accessory such as a PCMCIA card. In another arrangements, the network interface device 10 may be made part of the electronic device 12, such as an internal network interface card.

Figure 2:
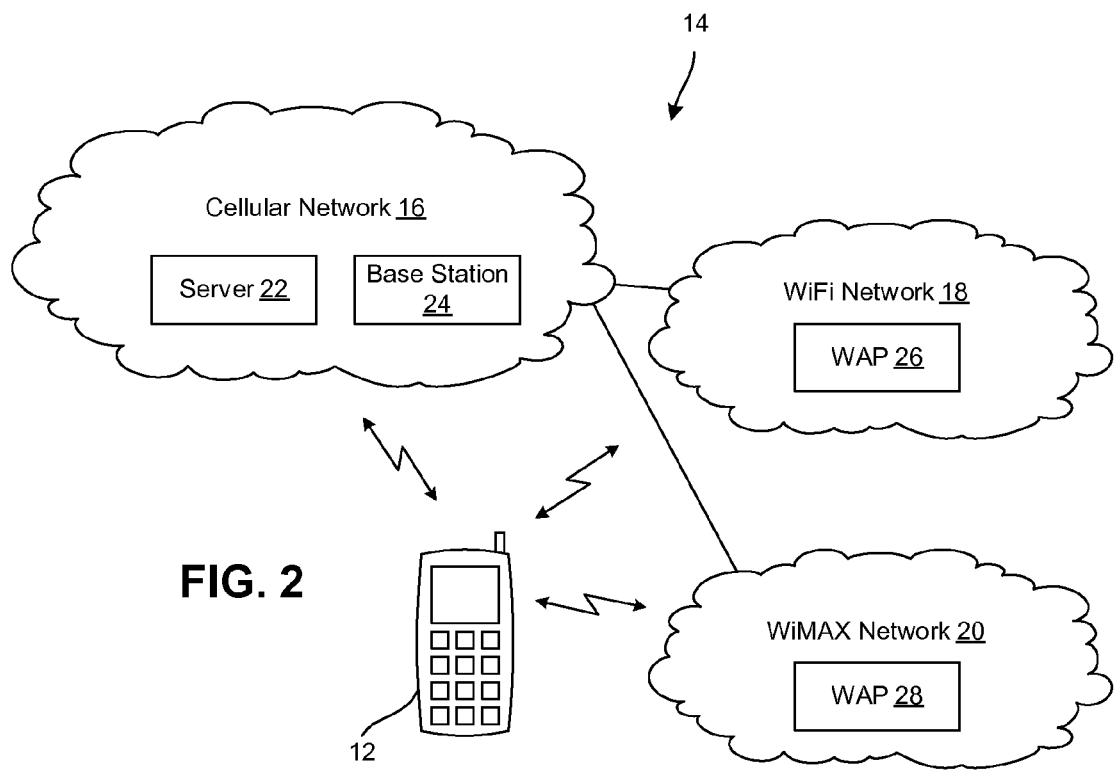
FIG. 2 is a schematic view of a communication system in which an electronic device may operate and where the electronic device has a network interface device that includes plural wireless network transceivers that share an antenna.
Figure 3:
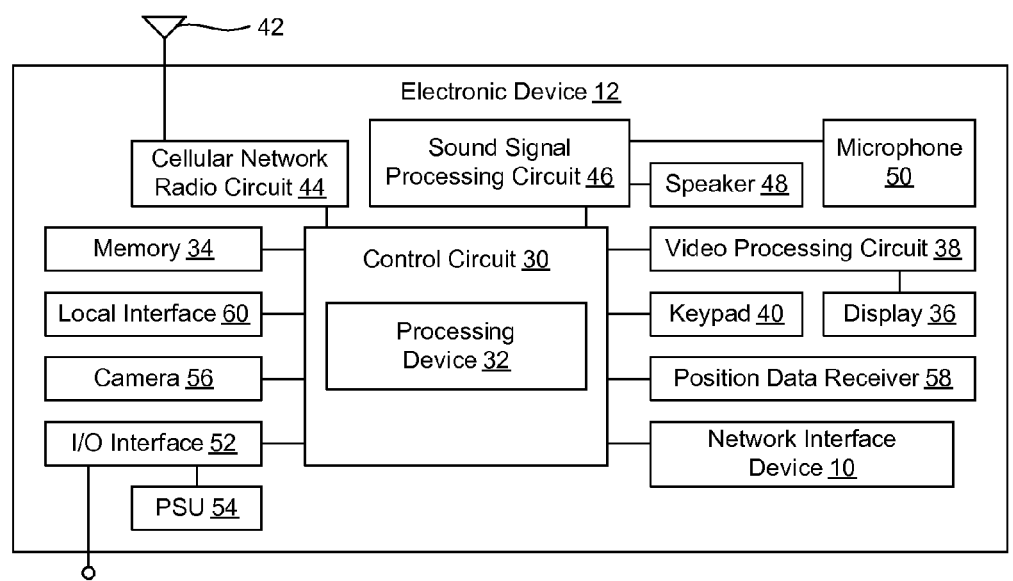
FIG. 3 is a schematic block diagram of the electronic device of FIG. 2.

FIGS. 2 and 3 show another environmental context in which the network interface device 10 may be employed. In this embodiment, the network interface device 10 is made part of the electronic device 12 and the electronic device 12 is embodied as a mobile telephone. The electronic device 12 may be configured to operate as part of a communications system 14. The system 14 may include, for example, a cellular communications network 16 and one or more wireless networks that operate using a respective packet switched communication protocol. For instance, the wireless networks may include a WiFi network 18 based on the IEEE 802.11 standard and a WiMAX network 20 based on the IEEE 802.16 standard.

In the illustrated embodiment, the communications network 16 includes a server 22 (or servers) for managing calls placed by and destined to the electronic device 12, transmitting data to the electronic device 12 and carrying out any other support functions. The server 22 may communicate with the electronic device 12 via a transmission medium. The transmission medium may be any appropriate device or assembly, including, for example, a communications base station 24 of the network 16 (e.g., a cellular service tower, or "cell" tower), a wireless access point (WAP) 26 of the WiFi network 18, a WAP 28 of the WiMAX network 20, a satellite, etc. The system 14 may support the communications activity of multiple electronic devices 12 and other types of end user devices. As will be appreciated, the server 22 may be configured as a typical computer system used to carry out server functions and may include a processor configured to execute software containing logical instructions that embody the functions of the server 22 and a memory to store such software.

In the illustrated embodiment of FIGS. 2 and 3, the electronic device 12 may include a primary control circuit 30 that is configured to carry out overall control of the functions and operations of the electronic device 12. The control circuit 30 may include a processing device 32, such as a central processing unit (CPU), microcontroller or microprocessor. The processing device 32 executes code stored in a memory (not shown) within the control circuit 30 and/or in a separate memory, such as a memory 34, in order to carry out operation of the electronic device 12. The memory 34 may be, for example, one or more of a buffer, a flash memory, a hard drive, a removable media, a volatile memory, a non-volatile memory, a random access memory (RAM), or other suitable data storage mechanism. In a typical arrangement, the memory 34 may include a non-volatile memory for long term data storage and a volatile memory that functions as system memory for the control circuit 30. While operational functions are described as being implemented in executable code that is executed by the processing device 32, such functionality could also be carried out via dedicated hardware or firmware, or some combination of hardware, firmware and/or software.

The electronic device may include a display 36 to visually display information to a user. The display 36 may be coupled to the control circuit 30 by a video processing circuit 38 that converts video data to a video signal used to drive the display 36. The video processing circuit 36 may include any appropriate buffers, decoders, video data processors and so forth.

A keypad 40 and/or other user input devices (e.g., a touch sensitive surface of the display 36, a navigation input device, etc.) may be present to provide for a variety of user input operations.

To support communications activity and other networking tasks of the electronic device 12, the electronic device 12 may include an antenna 42 coupled to a cellular network radio circuit 44. The radio circuit 44 includes a radio frequency transmitter and receiver for exchanging signals with the cellular network 16 via the antenna 42. Transceiver types for interaction with the cellular network 16 and/or another type of broadcasting network include, but are not limited to, global system for mobile communications (GSM), code division multiple access (CDMA), wideband CDMA (WCDMA), general packet radio service (GPRS), digital video broadcasting-handheld (DVB-H), integrated services digital broadcasting (ISDB), etc., as well as advanced versions of these standards. Therefore, it will be appreciated that the antenna 42 and the radio circuit 44 may represent one or more than one radio transceiver.

The network interface device 10 may be used to establish communication with the WiFi network 18 and/or the WiMAX network 20. Additional details of the network interface device 10 will be described in greater detail below.

The radio circuit 44 and the network interface device 10 may support the communications activity of the electronic device 12. For example, these interfacing components may enable the electronic device 12 to establish a call and/or exchange signals with another device over the communications system 14. For instance, the other device may be another mobile telephone or a landline telephone. However, the other device need not be another telephone, but may be some other device such as an Internet web server, a content providing server, a computer, etc. Calls may take any suitable form. For example, a call could be a conventional voice call, a voice over Internet Protocol (VoIP) call, a video enabled call, etc. In addition to engaging in calls, the electronic device 12 may be configured to transmit, receive and/or process data, such as text messages, instant messages, electronic mail messages, multimedia messages, data files, image files, video files, audio files, ring tones, streaming audio, streaming video, data feeds (including podcasts and really simple syndication (RSS) data feeds), Internet content, and so forth. Processing data may include storing the data in the memory 34, executing applications to allow user interaction with the data, displaying video and/or image content associated with the data, outputting audio sounds associated with the data, and so forth.

The electronic device 12 further includes a sound signal processing circuit 46 for processing audio signals transmitted by and received with the electronic device 12. Coupled to the sound processing circuit 46 are a speaker 48 and a microphone 50 that enable a user to carry on voice communication (e.g., a telephone call or a push-to-talk conversation) with a user of a remote device via the communications system 14. The sound processing circuit 46 may include any appropriate buffers, decoders, amplifiers and so forth.

The electronic device 12 may further include one or more input/output (I/O) interface(s) 52. The I/O interface(s) 52 may be in the form of typical mobile telephone I/O interfaces and may include one or more electrical connectors. As is typical, the I/O interface(s) 52 may be used to couple the electronic device 12 to a battery charger to charge a battery of a power supply unit (PSU) 54 within the electronic device 12. In addition, or in the alternative, the I/O interface(s) 52 may serve to connect the electronic device 12 to a headset assembly (e.g., a personal handsfree (PHF) device) that has a wired interface with the electronic device 12. Further, the I/O interface(s) 52 may serve to connect the electronic device 12 to a personal computer or other device via a data cable for the exchange of data. The electronic device 12 may receive operating power via the I/O interface(s) 52. The PSU 54 may supply power to operate the electronic device 12 in the absence of an external power source.

The electronic device 12 may include a camera 56 for taking digital pictures and/or movies. Image and/or video files corresponding to the pictures and/or movies may be stored in the memory 16.

The electronic device 12 also may include a position data receiver 58, such as a global positioning system (GPS) receiver, Galileo satellite system receiver or the like. The position data receiver 58 may be involved in determining the location of the electronic device 12.

The electronic device 12 also may include a local wireless interface 60, such as an infrared transceiver and/or an RF interface (e.g., a Bluetooth interface), for establishing communication with an accessory, another mobile radio terminal, a computer or another device. For example, the local wireless interface 60 may operatively couple the electronic device 12 to a headset assembly (e.g., a PHF device) in an embodiment where the headset assembly has a corresponding wireless interface.

Figure 4:
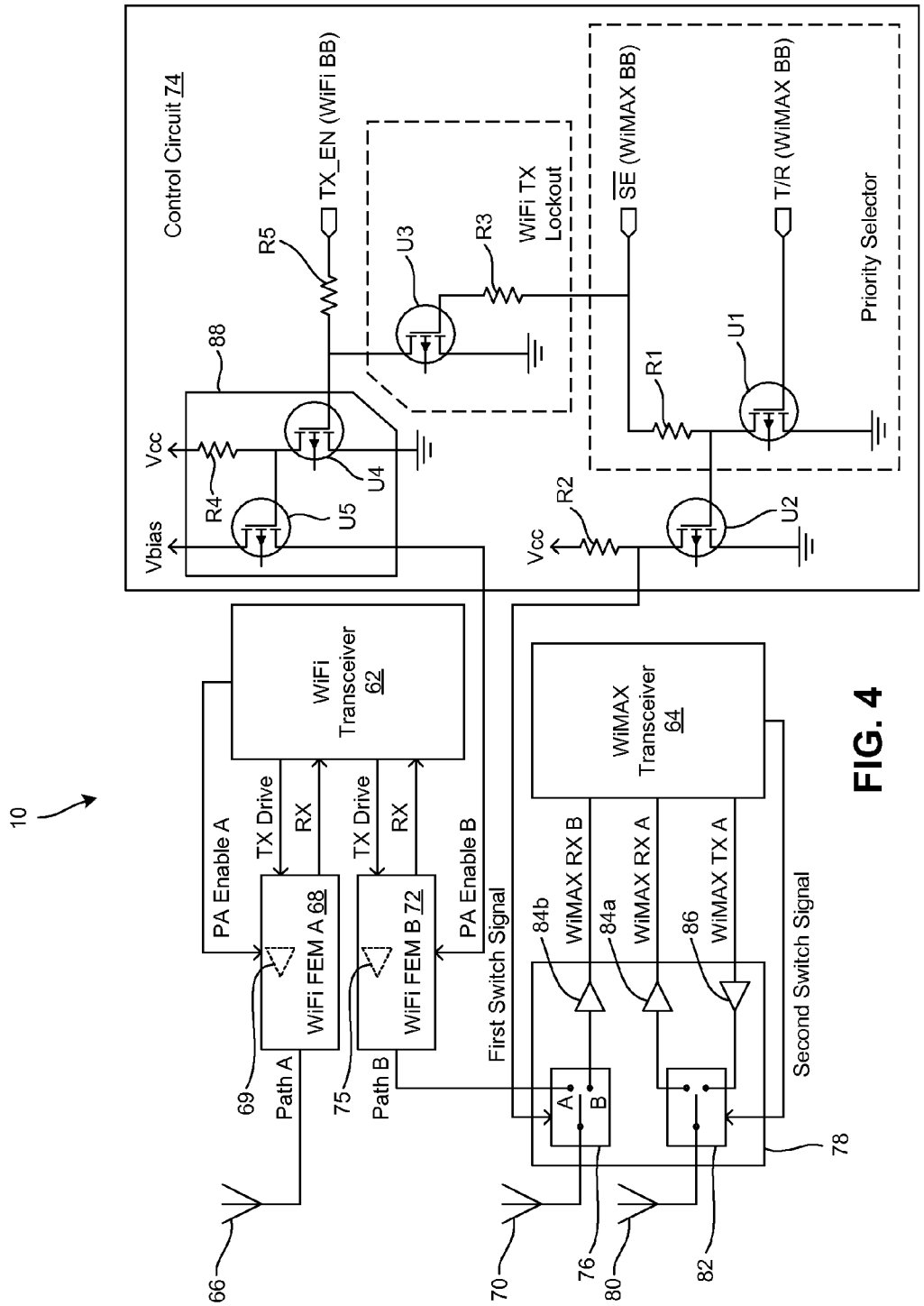
FIG. 4 is a schematic diagram of a network interface device that includes plural wireless network transceivers that share an antenna.

With additional reference to FIG. 4, details of the network interface device 10 now will be described. In the illustrated embodiment, the network interface device 10 is configured with two network transceivers, including a WiFi transceiver 62 for interfacing with the WiFi WAP 26 and a WiMAX transceiver 64 for interfacing with the WiMAX WAP 28. The WiFi transceiver 62 may be embodied using a standard WiFi chipset and the WiMAX transceiver 64 may be embodied using a standard WiMAX chipset. The WiFi transceiver 62 may be capable of operating under the WiFi N standard, as well as other WiFi conventions (e.g., WiFi A, WiFi B, WiFi G, etc.) that are affiliated with the IEEE 802.11 standard.

In accordance with WiFi N, the WiFi transceiver 62 may be a 2×2 multiple-input multiple-output (MIMO) transceiver that has a transmit drive output and a receive input for a first path (path A) and a transmit drive output and a receive input for a second path (path B). The path A transmit drive output and receive input of the WiFi transceiver 62 are coupled to a first antenna 66 using a first WiFi front end module (FEM), referred to as WiFi FEM A 68. The WiFi transceiver 62 may control a power amplifier (PA) 69 in the transmit side of the WiFi FEM A 68 using a PA enable signal (PA enable A).

Similarly, the path B transmit drive output and receive input of the WiFi transceiver 62 are coupled to a second antenna 70 using a second WiFi FEM, referred to as WiFi FEM B 72. The second antenna 70 may be shared with the WiMAX transceiver 64. Therefore, the second antenna 70 also may be referred to a shared antenna and the first antenna 66 may be referred to as a dedicated WiFi antenna. In order to manage usage of the shared antenna 70, control circuitry 74 may be present. Operation of the control circuitry 74 will be described in greater detail below. The control circuitry 74 may be responsible for controlling a power amplifier 75 in the transmit side of the WiFi FEM B 72 using a PA enable signal (PA enable B). In addition, the control circuitry 74 controls the position of a first RF mode switch 76 in a WiMAX FEM 78 using a first switch signal. As will be explained in greater detail, the switch 76 is steered by WiMAX baseband signals to commutate the shared antenna 70 between a WiMAX receive path and the WiFi N "B" path. Therefore, the first switch signal selectively allows use of the shared antenna 70 by the WiFi transceiver 62.

The WiMAX transceiver 64 may be a 2×1 MIMO transceiver that has a WiMAX transmit (TX) output (WiMAX TX A), a first WiMAX receive (RX) (WiMAX RX A) input and a second WiMAX receive (WiMAX RX B) input. The second WiMAX receive path input is selectively coupled to the shared antenna 70 using the switch 76 under the control of the first switch signal. The WiMAX transmit path output and the first WiMAX receive path input are selectively coupled to a third antenna 80 with a second RF mode switch 82 under the control of a second switch signal that is generated by the WiMAX transceiver 64. The third antenna 80 also may be referred to as a dedicated WiMAX antenna 80. The WiMAX FEM 78 may include a low noise amplifier (LNA) 84a and 84b in each of the WiMAX receive pathways and a power amplifier 86 in the WiMAX transmit pathway.

The control circuitry 74 generates the PA enable B signal and the first switch signal based on the state of three input signals, including a WiFi baseband (BB) transmit enable (TX EN) signal, an active low WiMAX baseband sleep enable (SE) signal, and a WiMAX baseband transmit/receive (T/R) signal. Table 1 is a logic table that indicates the value of the PA enable B signal and the first switch signal for the various values of input signals. In table 1, an X represents a "don't care" value that can be either logical high (represented by 1) or logical low (represented by 0).

TABLE 1

| Inputs | | | Outputs | |
| --- | --- | --- | --- | --- |
| $\overline{SE}$ | TX_EN | T/R | PA enable B | First Switch |
| 1 | X | 0 | 0 (lockout condition) | Node B (receive mode, function of T/R) |
| 1 | X | 1 | 0 (lockout condition) | Node A (transmit mode, function of T/R) |
| 0 | 0 | X | 0 (function of TX_EN) | Node A |
| 0 | 1 | X | Vbias (function of TX_EN) | Node A |

As may be appreciated from Table 1, the sleep enable signal governs the availability of the shared antenna 70 to the WiFi transceiver 62. When the WiMAX transceiver is active, the sleep enable signal will be locally high, giving priority of access of the shared antenna 70 to the WiMAX transceiver. In implementation, when the sleep enable signal is high, the PA enable B signal will be logically low, thereby maintaining the transmit-side power amplifier 75 of the WiFi FEM B in an off state. As such, the WiFi transceiver will loose the ability to transmit over WiFi path B.

Also, when the sleep enable signal is logically high, the WiMAX baseband T/R signal will control the position of the first switch. In a WiMAX transmission mode, the first switch signal will toggle the first RF mode switch 76 to a first pole (pole A) to couple the shared antenna 70 to the path B of the WiFi FEM B 72. This position of the switch 76 provides some isolation to the WiMAX receive path B. As a result, the position of switch 76 may buffer the receive path B from receiving power transmitted by the WiMAX antenna 80. The switch isolation may be about 20 decibels (dB) to about 22 dB, for example. In a WiMAX receive mode, the first switch signal will toggle the first RF mode switch 76 to a second pole (pole B) to couple the shared antenna 70 to the WiMAX receive path B so that received WiMAX signals may be input to the WiMAX transceiver 64. As a result, 2×1 MIMO operation of the WiMAX transceiver 64 may be accomplished.

Therefore, when WiMAX is active, the WiFi transmit B path is "locked out" by maintaining the power amplifier 75 in an off state. But the WiFi receive path B is effectively coupled to the shared antenna 70. Therefore, it is possible that WiFi MIMO receive operations may take place during WiMAX transmission, even though the control circuitry 74 gives the WiMAX transceiver 64 full priority to the shared antenna 70. It is further noted that the control circuitry 74 does not influence the WiFi path A operation, which may simultaneously engage in WiFi communication during WiMAX communications. But, in the WiMAX active state, the WiFi communications will not have full WiFi N performance (e.g., WiFi N performance being capable of achieving throughput of about 74 megabits per second (Mbit/s) and a maximum data rate of about 248 Mbit/s). Rather, the WiFi communication may be more akin to WiFi G operation, which uses one transmit output and one receive input to achieve a maximum data rate of about 54 Mbit/s.

When the WiMAX transceiver 64 is not operational, the sleep enable signal may be logically low. As a result, the WiFi transmit path B will not be locked out. In particular, the first switch signal will toggle the switch 76 to pole A to couple the shared antenna 70 to the WiFi FEM B. Also, the WiFi transmit enable signal will control the state of the PA enable B signal. When MIMO WiFi transmission over the WiFi transmit path B is called, the PA enable B will be set to a bias voltage (Vbias), which turns on the power amplifier in the WiFi FEM B so that WiFi transmission is accomplished using the shared antenna 70. Otherwise, the PA enable B is set to logical low to turn off the power amplifier to conserve power consumption.

A more detailed description of the arrangement and operation of the control circuitry 74 will now be made. Each field effect transistor (FET) in the illustrated embodiment of the control circuitry 74, with the exception of the below-described FET U5, is configured to implement an inverter function.

To implement the foregoing functional operation of the network interface device 10, the sleep enable signal may be applied to the source of a priority selector field effect transistor (FET) U1 through resistor R1. The WiMAX baseband T/R signal may be applied to gate of FET U1. A logical high for the sleep enable signal pulls up the priority selector FET so that the value of the WiMAX baseband T/R signal is inverted and output at the source of the priority selector FET U1. The source of an inverter FET U2 is connected to Vcc through resistor R2 and the gate of the inverter FET U2 is connected to receive the inverted WiMAX baseband T/R signal so that, in effect, the WiMAX baseband T/R signal is output as the first switch signal used to control the switch 76.

Also, the sleep enable signal is applied to the gate of a lockout FET U3 through resistor R3. When the sleep enable signal is logically high, the drain of lockout FET U3 is pulled down. As a result, an output of a high side switch 88 will be logical low. The output of the high side switch 88 is the PA enable B signal. Therefore, a logically high sleep enable value inactivates (e.g., "locks out") the WiFi path B transmit power amplifier. It is noted that in the illustrated embodiment, the WiFi transceiver 62 is not made aware that the path B WiFi transmit path has been locked out of operation.

This lockout reduces RF interference at switch 76 of the WiMAX FEM 78 that may adversely effect WiMAX reception over the WiMAX receive path B. The lockout also reduces power consumption by the power amplifier 75 in the WiFi FEM B during WiMAX activity. Power usage of the power amplifier 75 may be about one hundred milliamps to about 300 hundred milliamps. Since the pathway to the shared antenna 70 will not be available during a significant percentage of the time that there is WiMAX activity due to the positioning of the switch 76 at pole B, there is a reduced need to have the power amplifier 75 on when there is WiMAX activity.

When there is no WiMAX activity, the sleep enable signal is logical low. In this state, the priority selector FET U1 will not make transitions and the first switch signal also will be float up to Vcc to be logical high so that the switch 76 is switched to pole A so as to connect the WiFi path B to the shared antenna 70. Also, when the sleep enable signal is logical low, the WiFi baseband transmit enable signal may be used to control the state of high side switch 88. The high side switch 88 may be made up of FET U4 and U5 and resistor R4, where the source of lockout FET U3 is connected to the gate of FET U4. The source of FET U4 is connected to Vcc through R4 to pull up FET U4. The source of FET U4 is connected to the gate of U5 to control a switch state of FET U5. The source of FET U5 is connected to Vbias, which is a predetermined voltage value used to turn on the power amplifier in the WiFi FEM B 72.

The WiFi baseband transmit enable signal may be coupled to the gate of FET U4 through resistor R5. As a result, when the WiFi baseband transmit enable signal is logical low, the PA enable B signal output at the drain of FET U5 will be logical low so as to turn off the power amplifier 75 in WiFi FEM B 72. But when the WiFi baseband transmit enable signal is logical high, the PA enable B signal output at the drain of FET U5 will be Vbias so as to turn on the power amplifier 75 in WiFi FEM B 72 and allow for path B WiFi transmission using the shared antenna 70.

The described network interface device 10 allows for the WiFi transceiver 62 and the WiMAX transceiver 64 to share the shared antenna 70, while simultaneously providing full WiMAX performance and good WiFi performance during WiMAX activity. Due to the sharing of an antenna, the disclosed arrangement may consume less space than a conventional network interface device that has a full compliment of dedicated WiFi antennas and a full compliment of WiMAX antennas. The sharing also reduces current demands on a host power supply.

It will be appreciated that the described techniques may be extended to various combinations and numbers of antennas. For instance, a switch could be added to the WiMAX T/R path that uses the WiMAX antenna 80 so as to add a third receive path to the WiFi transceiver 64.

Although certain embodiments have been shown and described, it is understood that equivalents and modifications falling within the scope of the appended claims will occur to others who are skilled in the art upon the reading and understanding of this specification.

What is claimed is:

1. A wireless network interface device, comprising:
   a first wireless network transceiver;
   a second wireless network transceiver;
   an antenna that is shared between the first and second transceivers for concurrent operation of the first transceiver and the second transceiver;
   a control circuit that, during an active state of the second transceiver, locks out a transmission path of the first transceiver that uses the shared antenna; and
   a radio frequency mode switch having an output pole connected to the shared antenna and switchable between a first input pole and a second input pole, and the radio frequency mode switch is controlled by the control circuit to switch a receive path input of the second transceiver that is connected to the second input pole to the shared antenna during a receive mode of the second transceiver and a transmit and receive path of the first transceiver that is connected to the first input pole to the shared antenna during a transmission mode of the second transceiver; and
   wherein the lockout is achieved by turning off a power amplifier in a transmit path within a front end module of the first transceiver, an on/off state of the power amplifier controlled by an enable signal that is generated by the control circuit, the control circuit being configured so that during a non-active state of the second transceiver, the power amplifier in the transmission path from the first transceiver to the shared antenna is controlled using a transmit enable baseband signal of the first transceiver used to switch a first transistor, and during an active state of the second transceiver the first transistor being locked out from changing state by switching a transistor of a lockout portion of the control circuit, and during the active state of the second transceiver, the control circuit controls the position of the radio frequency mode switch using a transmit/receive baseband signal of the second transceiver that switches a second transistor; and
   wherein during the transmission mode of the second transceiver, the first transceiver receives signals compatible with an interface standard of the first transceiver via the shared antenna and radio frequency mode switch.

2. The wireless network interface device of claim 1, wherein the switch is part of a front end module for the second transceiver.

3. The wireless network interface device of claim 1, wherein the first transceiver is a WiFi transceiver and the second transceiver is a WiMAX transceiver.

4. The wireless network interface device of claim 1, wherein:
   the first transceiver has a first transmit/receive path that transmits and receives using an antenna dedicated to the first transceiver and a second transmit/receive path that uses the shared antenna; and
   the second transceiver has a transmit/receive path that transmits and receives using an antenna dedicated to the second transceiver and a second receive path that uses the shared antenna.

5. The wireless network interface device of claim 4, wherein the first transceiver is a 2×2 multiple-input multiple-output WiFi transceiver and the second transceiver is a 2×1 multiple-input multiple-output WiMAX transceiver.

6. The wireless network interface device of claim 1, wherein the first transceiver carries out wireless communication with a wireless access point of a first network and the second transceiver carries out wireless communication with a wireless access point of a second network simultaneously with the wireless communication carried out by the first transceiver.

7. The wireless network interface device of claim 1, wherein the wireless network interface device is part of a removable network interface accessory for an electronic device.

8. The wireless network interface device of claim 1, wherein the wireless network interface device is part of an electronic device.

9. The wireless network interface device of claim 8, wherein the electronic device is a mobile telephone.

* * * * *